(12) United States Patent
Grimes et al.

(10) Patent No.: US 12,524,432 B2
(45) Date of Patent: Jan. 13, 2026

(54) CONVERSION SYSTEM AND CONVERSION METHOD

(71) Applicant: YUIMEDI INC., Tokyo (JP)

(72) Inventors: Emiri Grimes, Tokyo (JP); Daijiro Wachi, Tokyo (JP)

(73) Assignee: YUIMEDI INC., Tokyo (JP)

( * ) Notice: Subject to any disclaimer, the term of this patent is extended or adjusted under 35 U.S.C. 154(b) by 0 days.

(21) Appl. No.: 18/573,201

(22) PCT Filed: Jun. 30, 2022

(86) PCT No.: PCT/JP2022/026432
§ 371 (c)(1),
(2) Date: Dec. 21, 2023

(87) PCT Pub. No.: WO2023/021863
PCT Pub. Date: Feb. 23, 2023

(65) Prior Publication Data
US 2024/0289346 A1    Aug. 29, 2024

(30) Foreign Application Priority Data

Aug. 19, 2021    (JP) .................................. 2021-134170

(51) Int. Cl.
*G06F 16/25*    (2019.01)
*G06F 16/215*    (2019.01)

(52) U.S. Cl.
CPC .......... *G06F 16/258* (2019.01); *G06F 16/215* (2019.01)

(58) Field of Classification Search
CPC .............................. G06F 16/258; G06F 16/215
USPC ......................................................... 707/756
See application file for complete search history.

(56) References Cited

U.S. PATENT DOCUMENTS

| | | | |
|---|---|---|---|
| 6,556,999 B1* | 4/2003 | Kloos | G16H 10/20 |
| 6,795,868 B1* | 9/2004 | Dingman | G06F 16/258 |
| | | | 707/999.203 |
| 2005/0251812 A1* | 11/2005 | Hayward | G06F 16/258 |
| | | | 719/328 |
| 2011/0119317 A1* | 5/2011 | Kazoun | G06F 16/258 |
| | | | 707/809 |

(Continued)

FOREIGN PATENT DOCUMENTS

| | | |
|---|---|---|
| JP | 2005-202850 | 7/2005 |
| JP | 2006-277642 | 10/2006 |

(Continued)

OTHER PUBLICATIONS

International Search Report issued in International Application No. PCT/JP2022/026432, Sep. 20, 2022, 5 pages w/translation.

*Primary Examiner* — Cam Linh T Nguyen
(74) *Attorney, Agent, or Firm* — Merchant & Gould P.C.

(57) ABSTRACT

A novel technology to support the data conversion can be proposed.

A conversion system to convert input data into fixed-form data comprising: a configuration means that registers a configuration file indicating a rule of conversion, a conversion means that converts input data into fixed-form data based on the configuration file, an error detection means that detects errors in conversion based on the configuration file, a display means that performs display processing of a display based on the error and a display of a conversion result screen including display to receive input regarding modification the configuration file.

9 Claims, 9 Drawing Sheets

(56) References Cited

U.S. PATENT DOCUMENTS

| | | | |
|---|---|---|---|
| 2016/0267156 A1* | 9/2016 | Kothari | G06F 16/258 |
| 2017/0068582 A1* | 3/2017 | Agarwal | G06F 11/076 |
| 2020/0110755 A1* | 4/2020 | Waldman | G06F 3/0484 |
| 2020/0126009 A1* | 4/2020 | Fu | G06F 16/2365 |
| 2020/0151252 A1* | 5/2020 | Guo | G06F 40/30 |
| 2021/0224223 A1* | 7/2021 | Muramoto | G06F 16/116 |
| 2022/0058204 A1* | 2/2022 | Masui | G06F 16/2308 |
| 2022/0207004 A1* | 6/2022 | Mire | G06F 16/1734 |

FOREIGN PATENT DOCUMENTS

| | | |
|---|---|---|
| JP | 2008-108144 | 5/2008 |
| JP | 2021-068120 | 4/2021 |

* cited by examiner

CONFIGURATION FILE CONCEPTUAL DIAGRAM

| FIXED-FORM DATA | INPUT DATA (CORRESPONDENCE INFORMATION) | CONVERSION PROCESS (CONVERSION INFORMATION) |
|---|---|---|
| PATIENT ID | PATIENT ID | - |
| HEIGHT(cm) | HEIGHT(m), WEIGHT(kg) | EXTRACTION OF CHARACER STRING BEFORE COMMA ... |
| WEIGHT(kg) | HEIGHT(m), WIGHT(kg) | EXTRACTION OF CHARACER STRING AFTER COMMA ... |

CONVERSION RESULT SUMMARY

| ※COMPARED TO LAST TIME IN ( ) | NUMBER OF CONVERSION PROCESSES | NUMBER OF ERRORS | ERROR RATION |
|---|---|---|---|
| WHOLE | 1809(+21) | 300(-12) | 16.6%(-5) |
| patient_id | 0(0) | 0(0) | 0%(0) |
| gender | 11(0) | 1(0) | 0.5%(0) |
| height | 191(0) | 0(0) | 0%(0) |
| size_x_unknown | 355(+2) | 21(0) | 8%(0) |
| size_y_unknown | 365(+7) | 121(-2) | 30%(-2) |
| size_z_unknown | 365(+8) | 221(-6) | 40%(-2) |

MODIFICATION SUGGESTION
- PLEASE CHECK THE MODIFICATION FOR DIFINITION OF CONVERSION OF THE COLUMN OF size_y_unknown.
- PLEASE CHECK THE MODIFICATION FOR CORRESPONDENCE THE COLUMN OF size_y_unknown.
- PLEASE CHECK THE MODIFICATION FOR DIFINITION OF CONVERSION OF THE COLUMN OF size_z_unknown.
- PLEASE CHECK THAT THERE ARE NO OMMISION IN THE INPUT DATA.

[ TO THE CONFIGURATION FILE MODIFICATION SCREEN ]   [ TO TRANSFORMATION RESULT DETAILS ]

FIG. 5

| MAPPING 19 CONVERSION 6 VALIDATE 4 | | | | | | CONFIGURATION FILE MODIFICATION |
|---|---|---|---|---|---|---|
| Mapping | | | | | | |
| patient_id | gender | height | size_x_unknown | size_y_unknown | size_z_unknown | smoke_status |
| 20001 | MAN | 169.2 | There is cancer of lung up 10.0 x 15.0 mm. | There is cancer of lung up 10.0 x 15.0 mm. | There is cancer of lung up 10.0 x 15.0 mm. | Column Does Not Exist |
| 20002 | MAN | 165.1 | There is cancer of lung. | There is cancer of lung. | There is cancer of lung. | ALREADY SMOKED |

FIG. 6

| MAPPING ⑲ CONVERSION ⑥ VALIDATE ④ | | | | | | CONFIGURATION FILE MODIFICATION |
|---|---|---|---|---|---|---|
| Mapping | | | | | | |
| patient_id | gender | height | size_x_unknown | size_y_unknown | size_z_unknown | smoke_status |
| 20001 | MAN | 169.2 | 10.0 | 15.0 | ∧ errors.0001 | |
| 20002 | MAN | 165.1 | ∧ errors.0001 | ∧ errors.0001 | ∧ errors.0001 | ALREADY SMOKED |

FIG. 7

| MAPPING 19 CONVERSION 6 VALIDATE 4 | | | | | | CONFIGURATION FILE MODIFICATION |
|---|---|---|---|---|---|---|
| Mapping | | | | | | |
| patient_id | gender | height | size_x_unknown | size_y_unknown | size_z_unknown | smoke_status |
| 20011 | MAN | 171 | 10.0 | 15.0 | | ALREADY SMOKED |
| 20012 | MAN | 752 value must be less than 300 | 12 | 13 | 14 | ALREADY SMOKED |

FIG. 8

CONVERSION SYSTEM AND CONVERSION METHOD

TECHNICAL FIELD

The present invention relates to conversion system, and conversion method for convert input data into fixed-form data.

BACKGROUND ART

For analyzing data, the data is needed to be in uniform format. However especially in the medical field, it often happens that data formats are difference according to a hospital system and an input format of person in charge, so that there has been a problem that analyzing is not easy.

In this respect, it has been known a conventional technique for converting data into standard format. In Patent Literature 1, regarding each item included in data in a predetermined format, a technique is disclosed that supports the creation of conversion definition by receiving selection of which item of source data is corresponded and allowing a user to specify a conversion process for each item.

CITATION LIST

Patent Literature

Patent Literature 1: JP 2021-068120 A

SUMMARY OF INVENTION

Technical Problem

As mentioned above, a format of medical data varies depending on a hospital, a person in charge, a department in charge, and target injuries or illnesses or the like. Herein, in analyzing the medical data, numerous data across hospitals are often used, and in this case, it has been necessary to create as many conversion definitions such as those in Patent Literature 1 as the number of input data types. Then, when trying to unify the data format for the purpose of data analysis, there has been a problem that it takes huge amount of effort for the conversion.

In view of the above circumstance, an approach may be thought to share the creation of conversion definition, for example, by asking a creator of the input data to create the conversion definition or the like. However, for creating the conversion definition, it is needed to understand not only contents of the input data, but also the conversion process. For example, when a person without knowledge of data conversion, such as a hospital personnel or a clerk, creates the conversion definition, there has been a problem that it is difficult to create an appropriate conversion definition. In addition, even if the conversion definition is created, it is difficult for the person without knowledge to judge whether it is appropriate, so that the quality of the conversion definition created depends on the ability of creator, and there has been a problem that it is difficult to create the conversion definition with constant quality.

The present invention has been made in the view of the above-described circumstances, and is directed to providing a new technology to support the data conversion.

To solve the above-described problem, the present invention is a conversion system to convert input data into fixed-form data comprising:

a configuration means that registers a configuration file indicating a rule of conversion, a conversion means that converts input data into fixed-form data based on the configuration file, an error detection means that detects errors in conversion based on the configuration file, a display means that performs display processing of a display based on the error and a display of a conversion result screen including display to receive input regarding modification the configuration file.

With such a configuration, by detecting error in the conversion based on a configuration file to display a conversion result screen that includes a display based on the error, and a display to receive input regarding modification of the configuration file, the user can easily recognize appropriateness of the created configuration file. In addition, by repeatedly modifying the configuration file and checking for error after the modification, anyone can easily aim to improve the quality of the configuration file.

In a preferred aspect of the present invention, input data and fixed-form data configured by multiple columns whose format are different respectively, the configuration file includes correspondence information that indicates a column in input data corresponding to one of the columns in fixed-form data, and conversion information that defines conversion process to convert input data into the format specified for each column, the conversion means executes a mapping process that corresponds one or plurality of columns in input data into one or plurality of columns in fixed-form data based on the correspondence information, and a conversion process that converts each column in input data into fixed-form data based on the mapping by the conversion information and a result of the mapping process, the error detection means detects errors in the mapping process and/or conversion process for each column fixed-form data, the conversion result screen displays a number of error or error rate for each column of fixed-form as a display based on the error.

With such a configuration, because the errors are detected for each column, the user can consider the modification of configuration file more easily.

In a preferred aspect, the conversion system stores a plurality of conversion dictionaries defining data before conversion and data after conversion in a database, the conversion means, as the conversion process, compares the data before conversion and the input data, extracts conversion dictionary in which the data before conversion and input data most closely match among a plurality of the conversion dictionaries, and converts each column in that input data into fixed-form data based on the extracted conversion dictionary.

With such a configuration, a conversion dictionary that best matches the input data can be extracted. This allows for effective conversion of the input data into the fixed-form data.

In a preferred aspect of the present invention, the error detection means detects as an error in that column when a column in fixed-form data cannot be obtained from input data based on the configuration file.

In a preferred aspect of the present invention, the error detection means detects as an error in that column when a value obtained from input data is abnormal value as a column of fixed-form data.

With such a configuration, for each column, it is possible to detect omissions of required items and abnormal values as error, and provide information to the user.

In a preferred aspect of the present invention, a modification suggestion means is also comprised that creates a suggestion regarding modification of the configuration file based on a number of errors or error rate of each column,
the conversion result screen displays the suggestion as a display based on the error.

With such a configuration, even the user without knowledge can easily consider modifying the configuration file.

In a preferred aspect of the present invention, the conversion result screen includes a display based on the errors before and after modification of configuration file when conversion is executed based on modified configuration file.

With such a configuration, it is possible to display how errors has changed due to the modification of the configuration file, and provide the user with information for considering the pros and cons of that modification.

In a preferred aspect, the fixed-form data is determined based on collection items specified by user in conversion process for a certain input data.

With such a configuration, by specifying the user's desired information as a collection item, the conversion process into the desired information can be executed.

To solve the above-described problem, the present invention is a conversion program to convert input data into fixed-form data causing a computer to function as:
 a configuration means that registers a configuration file indicating a rule of conversion,
 a conversion means that converts input data into fixed-form data based on the configuration file,
 an error detection means that detects errors in conversion based on the configuration file,
 a display means that performs display processing of a display based on the error and a display of a conversion result screen including display to receive input regarding modification the configuration file.

To solve the above-described problem, the present invention is a conversion method to convert input data into fixed-form data causing a computer to execute:
 a configuration step that registers a configuration file indicating a rule of conversion,
 a conversion step that converts input data into fixed-form data based on the configuration file,
 an error detection step that detects errors in conversion based on the configuration file,
 a display step that performs display processing of a display based on the error and a display of a conversion result screen including display to receive input regarding modification the configuration file.

Advantageous Effects of Invention

According to the present invention, a novel technology to support the data conversion can be proposed. Especially, by displaying the error of conversion based on the created configuration file and the display for input regarding the modification of the configuration file, it is possible to support the modification of the configuration file effectively.

BRIEF DESCRIPTION OF DRAWINGS

FIG. 2 is a conceptual diagram showing an example of a conversion configuration for the conversion system according to embodiment of the present invention.

FIG. 5 is a display example of a conversion result screen for the conversion system according to embodiment of the present invention.

FIG. 6 is a display example of a conversion result screen for the conversion system according to embodiment of the present invention.

FIG. 7 is a display example of a conversion result screen for the conversion system according to embodiment of the present invention.

FIG. 8 is a display example of a conversion result screen for the conversion system according to embodiment of the present invention.

DESCRIPTION OF EMBODIMENTS

Embodiment 1

Hereinafter, the conversion system of the present invention will be described with diagrams. Note that the embodiment shown below is an example of the present invention, and the present invention is not limited to following embodiments, and various configurations may be adopted.

For example, although the configuration, operation, or the like of the conversion system will be described in the present embodiment, a method, an apparatus, a computer program, or the like with similar configuration may also achieve the same effect. In addition, the program may be stored in recording medium. Here, the recording medium storing the program may be for example a non-transitory recoding medium such as CD-ROM or the like.

The present invention is regarding a system to create the configuration file defining the conversion process for converting the input data created in any format into the fixed-form data with format defined in advance. Here, the input data is data that is used as material for analysis and is created in various formats at each medical institution or the like. In addition the fixed-form data refers to data that follows a specific format. In the present embodiment, it is assumed and described that multiple input data created in the same format are to be converted together into the fixed-form data.

Figure 1:
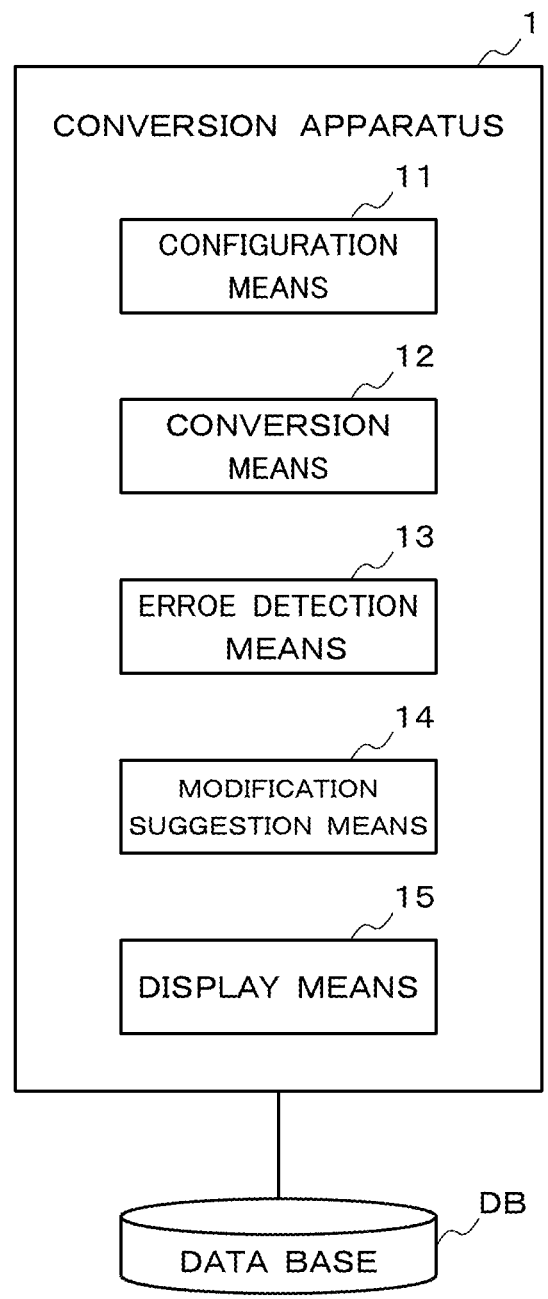
FIG. 1 is a functional block diagram of the conversion system according to embodiment of the present invention.

FIG. 1 is a functional block diagram of the conversion apparatus 1 that constitutes the conversion system in the present embodiment. Although the present embodiment describes configuration in which a single of computer comprises each means described below and functions as the conversion apparatus 1, the conversion apparatus 1 in the present embodiment may be achieved by multiple computers communicating with each other. In addition, a form of a client-server system may be adopted in which the conversion apparatus 1 and one or multiple clients communicates via a network and the conversion apparatus 1 functions as the server, executes processing based on input from the client, and transmits processing result to the client.

As the conversion apparatus 1, a general computer apparatus may be used that comprises an arithmetic device such as CPU (Central Process Unit) and GPU (Graphics Processing Unit) or the like, a main storage such as RAM (Random Access Memory) or the like, an auxiliary storage such as HDD (Hard Disk Drive), SSD (Solid State Drive), and a flash memory or the like, and various input and output devices or the like including means for connecting to the network. By storing a dedicated program (the conversion program) in the memory device and having the arithmetic device function as each of the following means with that program, any computer may be used as the conversion apparatus 1 in the present embodiment The conversion apparatus 1 comprises a configuration means 11, a conversion means 12, an error detection means 13, a modification suggestion means 14, and a display means 15, and is configured to be able to communicate with database DB each other wirelessly or by wire. Note that the database DB may be provided inside of the conversion apparatus 1.

The configuration means 11 registers the configuration file indicating the rules of conversion in the database DB. In the present embodiment, the configuration means 11 receives input from the user that specifies the correspondence between columns of the input data and the fixed-form data and creates correspondence information, and also receives input that specifies the conversion process for converting the input data into specified form for each column in the fixed-form data, creates the conversion information, and registers the configuration file including the correspondence information and the conversion information in the database DB.

FIG. 2 is a diagram showing the concept of the configuration file in the present embodiment. FIG. 2 shows, in the order from the left column, a column in the fixed-form data, a column of the input data corresponding to it (the correspondence information), and the conversion process for converting the column of the input data into format complied to the fixed-form data (the conversion information), respectively. In the present invention, a format of data to be converted, including multiple columns, is specified as the fixed-formed data. For example, it is assumed that data including information indicating patient ID, height, weight, and information indicating status of the injuries and illness or the like as a column is specified as the fixed-form data. In the present embodiment, the data format such as range of value and numerical value or character string or the like for each column, which indicates the definition of the fixed-form data, is registered in database DB in advance as the definition information.

Figure 3:
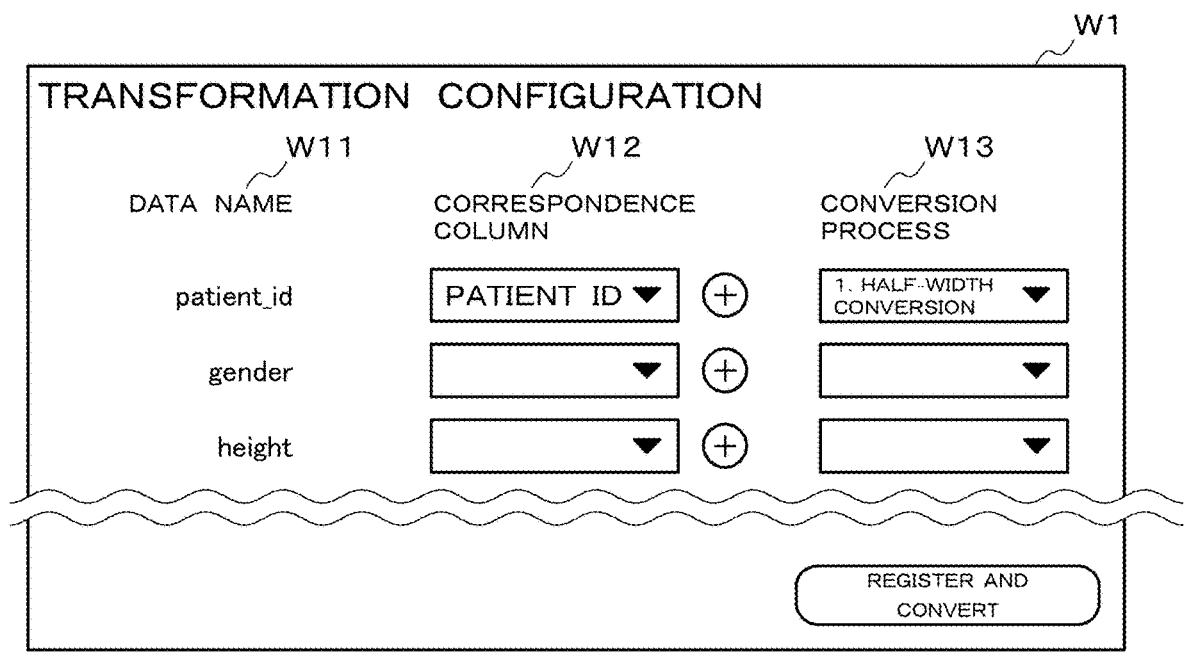
FIG. 3 is a display example of a screen for creating the configuration file for the conversion system according to embodiment of the present invention.

Next, a process for creating the configuration file is described with reference to a display example in FIG. 3. FIG. 3 is a display example of a configuration screen W1 displayed to the user to create the configuration file in the present embodiment. In the present embodiment, when a file of the input data to be converted is specified, the configuration screen W1 as shown in FIG. 3 is displayed. The configuration screen W1 comprises a fixed-form data column W11 that lists columns in the fixed-form data, a correspondence information input section W12 for selecting a column of the input data corresponding to each column in the fixed-form data, and a conversion information input section W13 for inputting the conversion process for converting each column into a format of the fixed-form data.

When dealing with data that is not unified in the format, a name of column may differ between the fixed-form data and the input data, or information to be divided into multiple columns in the fixed-form data may be included in a single column in the input data, then it is necessary to correspond a definition of column indicating items of information included in data. It is the correspondence information that indicates such correspondence of columns of the input data and columns of the fixed-form data.

In the correspondence information input section W12, for each column listed in the fixed-form data column W11, a selection of a column of the input data including information to be input in that column is received, and information identifying a selected column is registered as the correspondence information. Specifically, by selecting a triangle in the correspondence information input section W12, columns included in the input data are displayed in list, and the user may select an appropriate column from the list. In addition, when information expressed in a single column in the fixed-form data is spread over multiple columns in the input data, an input field is added by selecting "+" button in the correspondence information input section W12, and multiple columns of the input data can be associated with a single column in the fixed-form data. In this case, the user specifies a process for merging multiple columns as the conversion processing in the conversion information input section W13.

In addition, it is the conversion information that defines the processing procedure for converting the information in the column of the input data selected in the correspondence information input section W12 into the corresponding column of fixed-form data. In the conversion information input section W13, input of the conversion process for converting the column of input data entered in the correspondence information input section W12 into the columns of the fixed-form data is received. For example, in the case that "patient_id" in the fixed-form data is defined as half-width alphanumeric characters, while patient ID in the input data (the column specified in the correspondence information) is entered in full-width characters, it is assumed to specify a process for converting into half-width characters.

In addition to this, as the conversion process, it is assumed that for example in such a case where "height" and "weight" are defined as different columns in the fixed-form data, while the height and weight are entered in a single column with separated by comma in the input data, after regarding the correspondence information for both columns as "height/weight" column in the input data, a process that deletes the character string after the comma in the conversion information input section W13 for the "height" column, or a process that deletes the character string before the comma in the conversion information input section W13 for the "weight" column is specified, and so on. This allows for registering the conversion information indicating the conversion process in database DB with correspondence to target column of the fixed-form data.

When the triangle in the conversion information input section W13 is selected, an operation section for selecting such a conversion process is superimposed on the configuration screen W1. As the conversion information, multiple processes can be set with specifying that order regarding a single column, and for example, it may be specified that after the process that deletes unnecessary character string before and after regarding the column in the input data, a numeric conversion process for uniting unit is executed, and so on. In addition any process, such as different conversion process by conditional branching, may be received in the conversion information input section W13 and registered as the conversion information.

In this way, the configuration means 11 receives the input of the user and registers the correspondence information and the conversion information as the configuration file. Note that, as mentioned above, because the input data can be in many kinds of formats, multiple configuration files can be registered to correspond numerous input data. In addition, for example, the input data created in different departments of the same hospital may have similar formats. In such a case, it may be possible to create a new configuration file by receiving selection of the configuration file that already registered in the configuration screen W1, initially entering and displaying the correspondence information and the conversion information in that configuration file, and receiving that modification.

In the present embodiment, when the new configuration file is created as described above, the conversion of the input data is executed by the user selecting the display of "Register and Convert" at the bottom of the screen, and the user modifies the configuration file based on that result of execution. In this way, the user repeats procedure for creating the configuration file, executing the conversion, checking the result of the conversion, and modifying the configuration file based on the result, so that the user without knowledge can also create an appropriate configuration file.

Figure 4:
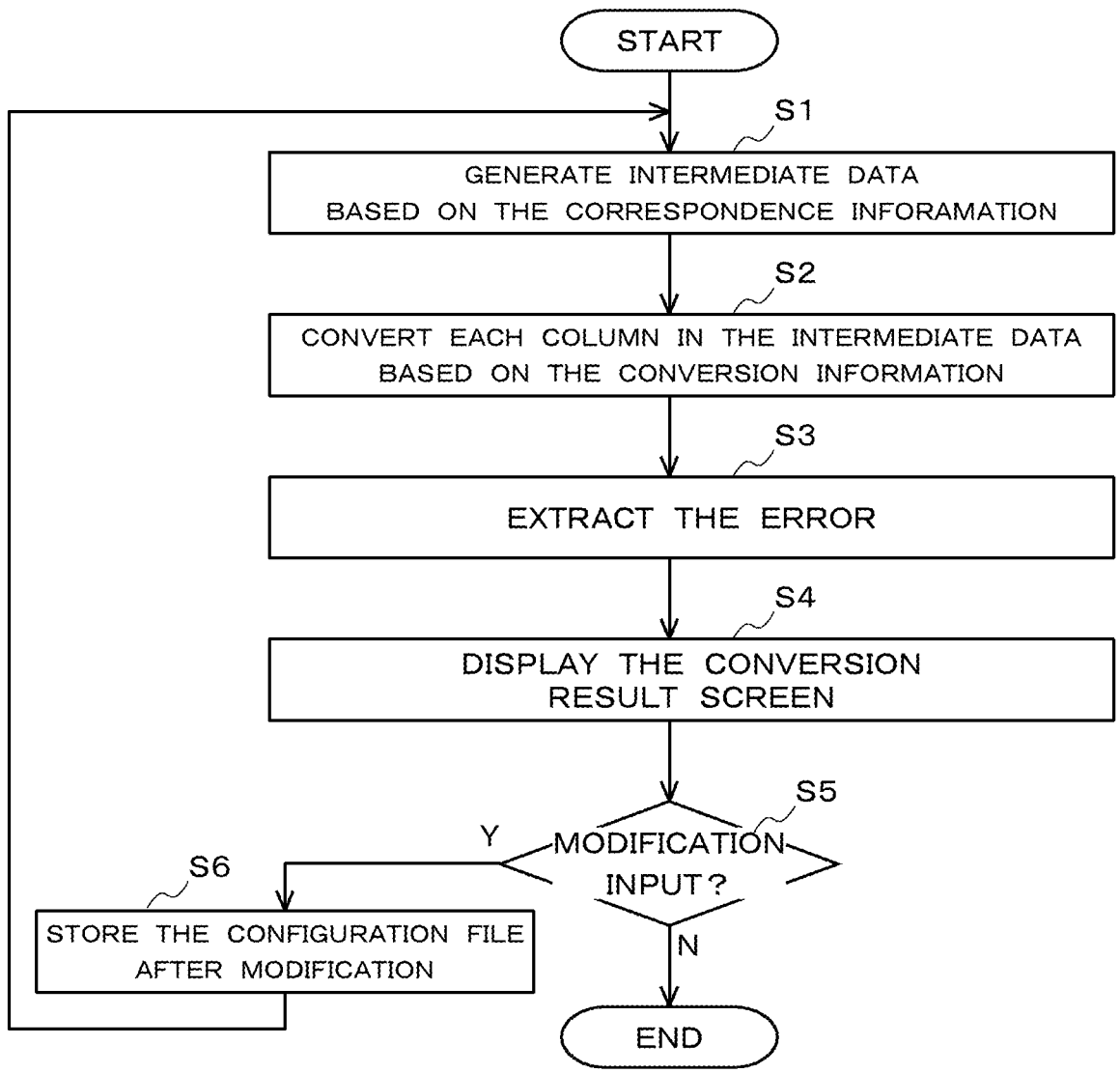
FIG. 4 is a flowchart showing an example of a processing procedure for creating of the configuration file for the conversion system according to embodiment of the present invention.

Next, the processing procedure from the conversion of the input data by the created configuration file to modification of the configuration file is described in detail with referring FIG. 4. First, when the input data to be converted and the configuration file to be used are specified, the process shown in FIG. 4 starts. Here, in the present embodiment, tabular data including information in multiple columns for multiple patients respectively is assumed as the input data. In the conversion of the input data, first at step S1, the conversion means 12 executes a mapping process. In the mapping process, the conversion means 12 creates intermediate data, which copies information in each column of the corresponding input data to each column of the fixed-form data, based on the correspondence information. The intermediate data is data that has multiple columns defined in the fixed-form data, and is data that has copied information of one of the columns to which the input data corresponds into each column based on the correspondence information.

Next, at step S2, the conversion means 12 executes the conversion process. In the conversion process, a process defined in the conversion information is executed to each column of the intermediate data corresponding to columns of the fixed-form data respectively.

For example, when "165.55" or the like is registered in the "height or weight" column of the input data, the "height/weight" column of input data is specified as the correspondence information of "height" column of the fixed-form data. Then, as the intermediate data, this information is registered in "height" column as it is. And, the conversion information of the "height" column, by registering "a process that deletes character string after comma", ", 55" is removed from the intermediate data and character string of "165" can be obtained as the "height" column in the conversion process.

In this way, by executing the mapping process that creates the intermediate data based on the correspondence information (step S1) and the conversion process that processes the intermediate data based on the conversion information (step S2), the input data can be converted into the fixed-form data. It is, however, difficult for the user without knowledge of the data conversion to create the appropriate configuration file at once. Thus, the present invention further extracts errors as a result of the conversion based on the configuration data.

At step S3, the error detection means 13 extracts the error for each column of the fixed-form data regarding each process of the mapping and the conversion process. In the present embodiment, the error is detected when information that is corresponded to the column of the fixed-form data cannot be obtained from the column of the input data even though the correspondence information is specified, and when the data converted as the column of the fixed-form data does not meet the preregistered format of the fixed-form data.

For example, when information of a column that is specified in the input data is missing in the first place, the error is detected as those of that column in the mapping process, because a problem occurs on creating the intermediate data. In addition, for example, in the case that even though data is entered, the data gets missed or gets an abnormal value as the result of process according the conversion information of the configuration file, the error is respectively detected as those of missing and abnormal value of that column in conversion process.

The error detection means 13 in the present embodiment also calculates the number of conversions, the number of errors, and error rate, respectively, for each column of the fixed-form data. Here, the number of conversions means the number of bunch of processes that are executed until the fixed-form data is obtained from the intermediate data. The error rata means ratio that is obtained by dividing the number of errors by the number of the input data. In other words, it means ratio of data in which an error occurred in the process of the conversion among the input data. The number of the conversions, the number of errors, and the error rate are also calculated for the total value of all columns.

In this way, when the conversion and the error detection have been completed, the display means 15 performs display processing of the display of error information, and the conversion result screen is displayed on a display connected to the conversion apparatus 1. FIG. 5-FIG. 8 are diagrams showing display examples of the conversion result screen.

In the present embodiment, at step S4, a result summary screen W2 shown in FIG. 5 is displayed first as the conversion result screen. The result summary screen W2 displays the number of conversions, the number of errors, and the error rate calculated by the error detection means 13 for the entire input data and for each column of the fixed-form data.

In the present embodiment, furthermore, the modification suggestion means 14 creates suggestion information regarding the modification of the configuration file based on the value calculated by the error detection means 13. When the number of errors and the error rate of a particular column exceeds a predetermined threshold, the modification suggestion means 14 in the present embodiment creates the suggestion information for that column. Here, the modification suggestion means 14 further determines whether the error occurs more in the mapping process or in the conversion process by the threshold or the ratio, and creates appropriate suggestion information among the suggestion information for the mapping process or the suggestion information for the conversion process. In addition, when the number of missing errors or the error rate in the mapping process exceeds a predetermined threshold, the modification suggestion means 14 creates the suggestion information to prompt check of the input data.

For example, in the example in FIG. 5, the number of errors and the error rate of "size_y_unknown" and "size z unknown" are higher than those of other columns. In such a case, the modification suggestion means 14 creates the suggestion information for these columns, and passes it to the display means 15.

When the suggestion information is received by the modification suggestion 14, the display means 15 performs processing of a display of the suggestion information together with the number of the conversions, the number of errors, and error rate, and in the result summary screen W2, modification suggestion W21 is displayed as shown in FIG. 5.

Here, when display of "to the configuration file modification screen" at the bottom of the screen is selected, the configuration screen W1 described above is displayed with the information of the configuration file used for the conversion entered. In the present embodiment, a column name of the modification suggestion 21 is displayed as a link, and when that link is selected, the input field of target columns in the configuration screen W1 is displayed. In other words, in the present embodiment, the display of "to the configuration file modification screen" in the result summary screen W2 and the link of column name in the modification suggestion W21 function as a display to receive input regarding the modification of the configuration file.

In addition, when display of "to conversion result details" at the bottom of the screen is selected, detail screen W3 shown in FIGS. 6-8 is displayed. FIG. 6 shows a result of the mapping process, FIG. 7 shows a result of the conversion process, and FIG. 8 shows a result of the anomaly detection based on the result of the conversion process, respectively.

As the result of the mapping process, the intermediate data is respectively displayed for each column of each data, and when there are any deficiencies in the intermediate data, missing columns of the target data are displayed with identifiable. An example in FIG. 6 shows state in which the column of "smoke_status" in data whose "patient_id" is 20001 is missing.

In addition as the result of the conversion process, data obtained by the conversion process are displayed for each column of each data, and columns in which errors occurred during the conversion process and columns in which values could not be obtained by the conversion process are displayed with identifiable. An example in FIG. 7 shows state in which value could not be obtained by the conversion process of column of "size_z_unknown" in data whose "patient_id" is 20001, column of "size_x_unknown", "size_y_unknown", "size_z_unknown" in data whose "patient_id" is 20002.

In addition, as the result of anomaly detection based on the result of the conversion process, while the same information as those shown in FIG. 7 are displayed as each data and values are obtained, data whose value are out of range in the definition information of the fixed-form data registered in database DB and columns of data that do not meet an input rule are displayed with identifiable. Here in the present embodiment, the missing column displayed in FIG. 7 is not highlighted, and displayed in the same way as the other columns.

Here, in the detail screen W3, the display format may be different depending on the type of error. For example, in an example of FIG. 8, it is assumed that different color are used when data type differs from the definition information and when range of value exceeds the definition information. This allows the user to sensibly recognize which kind of error are most common and help modify the configuration file.

A button of "modification of the configuration file" is displayed at top of such detail screen W3. When this button is selected, the configuration screen W2 described above is displayed with information in the configuration file used for the conversion entered in the same way as when the button of "to the configuration file modification screen" on the summary screen W2 is selected. In other words, in the present embodiment, the display of "configuration file modification" on the detail screen W3 functions as a display to receive input regarding modification of the configuration file.

On the conversion result screen such as shown in FIGS. 5-8, when no input is received to modify the configuration file (at step S5 in FIG. 4 is N), the latest version of the configuration file is stored and process is terminated. On the other hand, when there is modification input, namely, when an input desired to be modified is made on the conversion result screen, the configuration screen W1 is displayed that has been entered based on the configuration file, the configuration file is modified through the configuration screen W1, and display of "register and convert" is selected again (at step S5 in FIG. 4 is Y), then step S1 to step S5 are repeated again. This allows even an unexperienced user to create an appropriate configuration file by repeating the procedure for creating the configuration file, trying the conversion, checking that result, and modifying the configuration file based on it.

Here, in the case of the second and subsequent conversion display for the same input data, namely, when displaying the result of the conversions executed after step S6 in FIG. 4, difference from numerical values in the previous conversion (in parentheses after numerical values in FIG. 5) is displayed for each item of the number of the conversion processes, number of errors and error rate for the whole and each column in the summary screen W2 shown in FIG. 5 described above. This makes it easier for the user to determine whether or not the modification is appropriate, because the user can check for increase and decrease of error and the number of process compared to the previous conversion which is those before the configuration file is modified. This more effectively supports the creation of the configuration file by repeating attempts to modify and convert the configuration file.

As described above, according to the conversion system in the present embodiment, by simultaneously displaying on the conversion result screen a display for errors in the conversion based on the configuration file, and a display to receive the input for modification of the configuration file, it is possible to support the user's creation and modification of the configuration file and the attempt to convert using that configuration file, and can help create effective and appropriate configuration file. Furthermore, according to the conversion system in the present embodiment, by executing the mapping process and the conversion process for each column and detecting errors, it is possible to provide reference information to the user regarding modification details of the configuration file and more effectively support the creation of configuration file.

Embodiment 2

Next, in the embodiment 2, a case is described where multiple medical institutions or the like convert common input data into the fixed-form data as a project. The database DB2 of the server, the configuration file is registered for each project, and each medical institution or the like receives the column of the fixed-form data for that project by participating in that project. Then, based on that column, each medical institution or the like registers the configuration file to convert each input data into the fixed-form data.

In addition, in the embodiment 2, a case is described where in the terminal DB (equivalent to the database DB in the embodiment 1) or database DB2 of server, project information, a conversion dictionary defining conversion of data, and a dictionary for detection in which specific character strings are set are registered in advance.

In the embodiment 1, based on the conversion information entered in the configuration file, each column in the input data is converted into the fixed-form data (in an example in the FIG. 3, "patient ID" entered in full-width characters is converted into "patient_id" in half-width characters). On the other hand, in the present embodiment, in addition to the conversion information based on the configuration file, each column of the input data is converted into the fixed-form data based on the conversion dictionary. In addition, though in the embodiment 1, the errors are detected according to whether or not a format of converted data meets the format of the fixed-form data, in the present embodiment, the errors are detected according to whether or not the format of converted data meets the character string set in the dictionary for detection, in addition to or instead of the format of converted data.

In the present embodiment, a set of columns in the converted data is called a collection item. In addition, in the following description, the system according to the present embodiment functions each functional configuration, and parts in common with the embodiment 1 are omitted.

Figure 9:
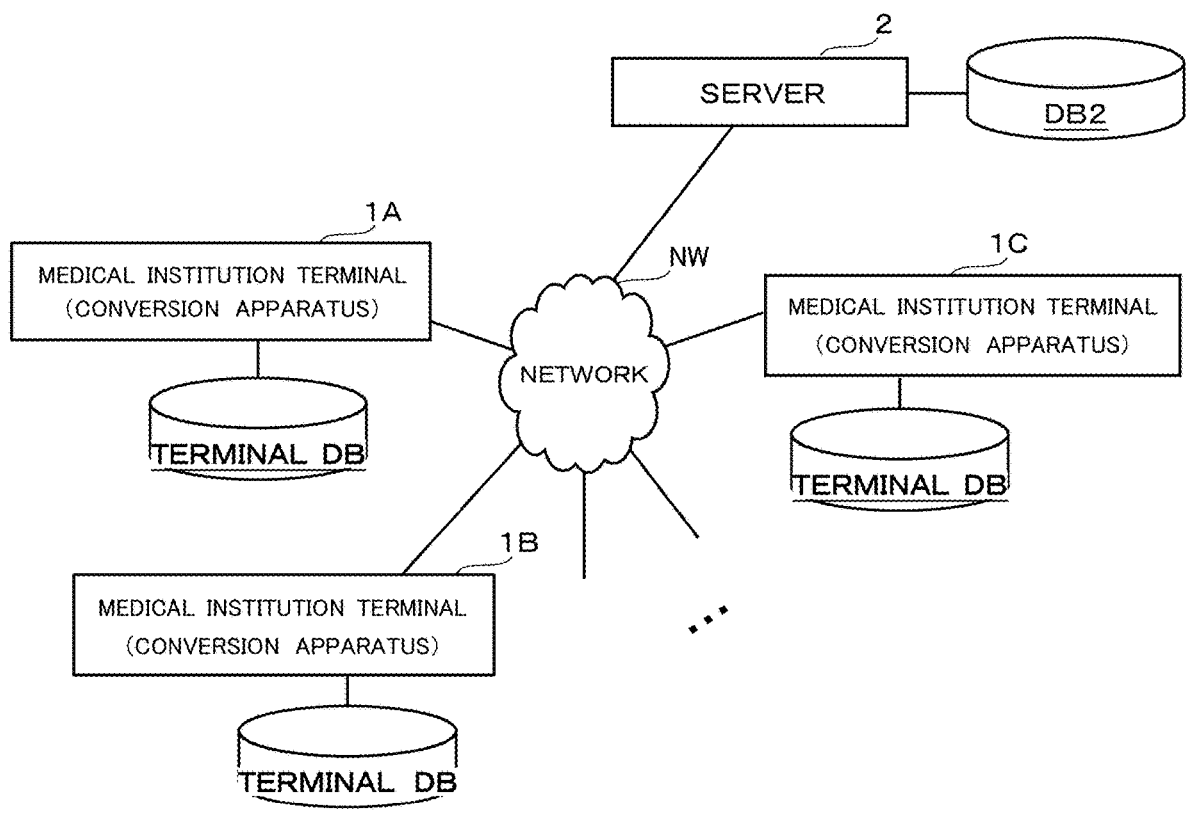
FIG. 9 is a block diagram showing the configuration for the conversion system according to another embodiment of the present invention.

FIG. 9 is a block diagram showing the configuration of the conversion system in the present embodiment. As shown in FIG. 9, the conversion system are composed of multiple medical institution terminals (1A, 1B, . . . , hereafter referred to as 1A on behalf of 1A, 1B, . . . ) and a server 2, and those are configured to be communicable via a communication network NW.

In the present embodiment, the medical institution terminal 1A installs the conversion program according the present invention, and comprises the same functional configuration with the conversion apparatus 1. In addition, the medical institution terminal 1A is wired or wireless connected to the terminal DB that registers the input data, multiple conversion dictionaries and the dictionaries for detection, and can communicate with each other.

Here, the conversion dictionary is information in which multiple conversion dictionaries defining the conversion of the input data are registered in advance. Specifically, the conversion dictionary is information in dictionary format that defines data before conversion and after conversion, includes multiple sets of character strings before conversion and after conversion for each conversion dictionary. As the conversion dictionary, for example, there are standard conversion dictionary that define the conversion into standard medical terms, and unique conversion dictionary that define the conversion into terms used by each medical institution, or the like.

Here, the dictionary for detection is information to detect the data after conversion. Specifically, the dictionary for detection is information that includes specific character strings in list format that can be used as data after conversion. As the specific character string, for example, the name of the medicine, and injuries and illnesses posted by the government.

In the present embodiment servers registers the project information and configuration file configured based on the project information in the database DB2. Here, the project information is uniquely identified by a project ID, and one or more collection items (a set of column names of the fixed-form data) are registered in advance associated with the project ID. Then, the collection items are associated with the definition information for each one or more columns. For example, "blood test value" is registered as the collection item, and "WBC (White Blood Cell)", "blood hemoglobin concentration" are registered as that column in association. In other words, the collection item is information that indicates classification of subordinate columns and that definition information.

In the present embodiment, the configuration file includes columns in the fixed-form data specified based on the collection items corresponding to the project information. Specifically, the configuration file in FIG. 3 includes "patient_id", "gender", and "height" as the columns in the fixed-form data. Note that, in the present embodiment, though the medical institution terminal 1 comprises the conversion means 12, server 2 may comprise the conversion means 12, and create the fixed-form data based on the configuration file and the input data received from the medical institution terminal.

Note that, in the present embodiment, the conversion dictionary and/or dictionary for detection are registered in terminal DB, but may be registered in database DB2. In such a case, the medical institution terminal 1A may receive the result of the conversion process and detection by transmitting data subject to the conversion process or detection to the server 2 via the communication network NW, and making the server 2 to execute the conversion process/detection.

In the present embodiment, the conversion means 12 converts each column in the input data into the fixed-form data based on specific conversion dictionary among the plurality of conversion dictionaries. Specifically, the conversion means 12 compares the data before conversion and the input data, extracts one of the plurality of conversion dictionaries in which the data before conversion and the input data most closely match among the plurality of the conversion dictionaries, and converts each column in that input data into the fixed-form data based on the extracted conversion dictionary.

More specifically, the conversion means 12 compares character strings of each column in the input data and character strings of data before conversion in the plurality of the conversion dictionaries, extracts one of plurality the conversion dictionaries in which the character strings of all columns in the input data and the character strings of data before conversion most closely match, and converts each column in that input data into fixed-form data (the data after conversion) based on the extracted conversion dictionary.

Note that, though in the present embodiment, the conversion means 12 extracts a single of the conversion dictionary in which the character strings of all columns in the input data and the data before conversion most closely match, the conversion means 12 may extract the conversion dictionary for each column in the input data. In other words, the conversion means 12 may compare the data before conversion and the input data for each column of the input data, extract one of the plurality conversion dictionaries, and execute the conversion process for each column.

In the present embodiment, the detection means 13 executes error detection for each column in the data after conversion based on the dictionary for detection. Specifically, the detection means 13 uses the dictionary for detection for the input data that has been converted into the format of the fixed-form data based on the conversion information and/or the conversion dictionary. Then, the detection means 13 detects the error when any of character strings in each column of that input data does not match the character strings in the dictionary for detection.

In addition, the detection means 13 executes the error detection based on the data format of the a plurality of the fixed-form data corresponding to the collection item and the data after conversion. Specifically, the detection means 13 detects the error when the data format of each column in the data after conversion does not match data type (string, numeric, date) of the fixed-form data. In addition, the detection means 13 may detect errors according to whether or not the data after conversion is an empty value, and detect errors when each column of the data after conversion has the same string.

Note that, in the present embodiment, the conversion means 12 executes the conversion process on the input data using either the conversion dictionary or the conversion information, but may execute the conversion process using the conversion information after executing the conversion process by the conversion dictionary. Conversely, the conversion means 12 may execute the conversion process using the conversion dictionary after executing the conversion process by the conversion information. Note that in the present embodiment, the detection means 13 executes the error detection for the input data that has been converted into the format of the fixed-form data, but may convert the input data into the fixed-form data, after executing the error detection for each column in the input data.

As described above, according to the conversion system in the present embodiment, by using the conversion dictionary, it is possible to convert the input data into the fixed-form data without entering the conversion dictionary. Furthermore, according to the conversion system in the present embodiment, by using the dictionary for detection, it is possible to execute the detailed error detection for the character string. Then these effects enable more efficient and appropriate conversion process and error detection, provide the reference information to the user regarding modification details of the configuration file, and more effectively support the creation of the configuration file.

REFERENCE SIGNS LIST

1: conversion apparatus
11: configuration means
12: conversion means
13: error detection means
14: modification suggestion means
15: display means
W1: configuration screen
W11: fixed-form data column
W12: correspondence information input section
W13: conversion information input section
W2: summary screen
W21: modification suggestion
W3: detail screen

The invention claimed is:

1. A conversion system that is configured to convert input data into fixed-form data comprising:
a hardware processor;
wherein
the input data and the fixed-form data each comprise multiple columns, the multiple columns of the input data being different in format from the multiple columns of the fixed-form data;
the hardware processor is configured to register a configuration file;
the configuration file includes correspondence information that indicates correspondence of a column of the multiple columns of the input data to one of the multiple columns in the fixed-form data, and conversion information that defines a conversion process to convert input data into a format specified for each column;
the hardware processor is configured to execute:
a mapping process, wherein the mapping process determines a correspondence of one or more of the multiple columns of the input data to one or more of the multiple columns of the fixed-form data based on the correspondence information, and
the conversion process defined in the conversion information, wherein the conversion process converts each column of the input data into the fixed-form data based on the mapping by the conversion information and a result of the mapping process;
the hardware processor is configured to detect mapping errors in the mapping process and conversion errors in the conversion process;
the hardware processor is configured to determine, based on the number of the mapping errors and the number of the conversion errors, which of the mapping errors and the conversion errors occurs more frequently, and to create suggestion information regarding modification of the configuration file based on which of the mapping errors and the conversion errors occurs more frequently; and
the hardware processor is configured to perform display processing of a display of a conversion result screen including a display based on the mapping error or the conversion error.

2. The conversion system according to claim 1, wherein:
the hardware processor is configured to display fields for displaying a plurality of columns of the fixed-form data and input fields for selecting columns of the input data corresponding to the respective columns of the fixed-form data;
the hardware processor is configured to receive a selection of a column of the input data in the input field and register the configuration file including the correspondence information indicating correspondence between the selected column of the input data and a column of the fixed-form data corresponding to the selected column;
the suggestion information includes a column of the fixed-form data to be corrected, based on a number of errors or an error rate for each column of the fixed-form data; and
the hardware processor is configured to receive a selection of the column of the fixed-form data to be corrected and display the input field corresponding to the selected column of the fixed-form data.

3. The conversion system according to claim 2,
wherein the hardware processor is configured to detect as an error in that column when a column of the fixed-form data cannot be obtained from the input data based on the configuration file.

4. The conversion system according to claim 2,
wherein the conversion result screen includes a display based on the mapping errors or the conversion errors before and after modification of the configuration file when the conversion process is executed based on a modified configuration file.

5. The conversion system according to claim 2,
wherein the hardware processor is configured to detect the mapping error and the conversion error for each column of the fixed-form data, and the conversion result screen displays, based on the mapping error or the conversion error, the suggestion information and the number of errors or error rate for each column of the fixed-form data on the same screen.

6. The conversion system according to claim 1,
wherein the hardware processor is configured to detect as an error in that column when a value obtained from the input data is an abnormal value as a column of the fixed-form data.

7. The conversion system according to claim 1,
wherein the fixed-form data is determined based on collection items specified by a user in the conversion process for a certain input data.

8. A non-transitory computer-readable medium that stores a conversion program to convert input data into fixed-form data, wherein the input data and the fixed-form data each comprise multiple columns, the multiple columns of the input data being different in format from the multiple columns of the fixed-form data, the conversion program causing a computer to:

register a configuration file, wherein the configuration file includes correspondence information that indicates a column in the input data corresponds to one of the columns in the fixed-form data, and conversion information that defines a conversion process to convert input data into a format specified for each column;

execute a mapping process, wherein the mapping process determines a correspondence of one or more of the multiple columns of the input data to one or more of the multiple columns of the fixed-form data based on the correspondence information;

execute the conversion process defined in the configuration file, wherein the conversion process converts each column in the input data into the fixed-form data based on the mapping by the conversion information and a result of the mapping process;

detect a mapping error in the mapping process and a conversion error in the conversion process;

determine, based on the number of the mapping errors and the number of the conversion errors, which of the mapping errors and the conversion errors occurs more frequently, and to create suggestion information regarding modification of the configuration file based on which of the mapping errors and the conversion errors occurs more frequently; and display a conversion result screen including a display based on the mapping errors or the conversion errors.

9. A conversion method being executed by a hardware processor connected to a storage, wherein input data and fixed-form data each comprise multiple columns, the multiple columns of the input data being different in format from the multiple columns of the fixed-form data, the conversion method comprising:

register a configuration file, wherein the configuration file includes correspondence information that indicates a column in the input data corresponds to one of the columns in the fixed-form data, and conversion information that defines a conversion process to convert the input data into a format specified for each column;

executing a mapping process that determines a correspondence of one or more of the multiple columns of the input data to one or more of the multiple columns of the fixed-form data based on the correspondence information;

executing the conversion process defined in the conversion information, wherein the conversion process converts each column in the input data into the fixed-form data based on the mapping by the conversion information and a result of the mapping process;

detecting mapping errors in the mapping process and conversion errors in the conversion process;

determining, based on the number of the mapping errors and the number of the conversion errors, which of the mapping errors and the conversion errors occurs more frequently, and creating suggestion information regarding modification of the configuration file based on which of the mapping errors and the conversion errors occurs more frequently; and displaying a conversion result screen including a display based on the mapping errors or the conversion errors.

* * * * *